UNITED STATES PATENT OFFICE.

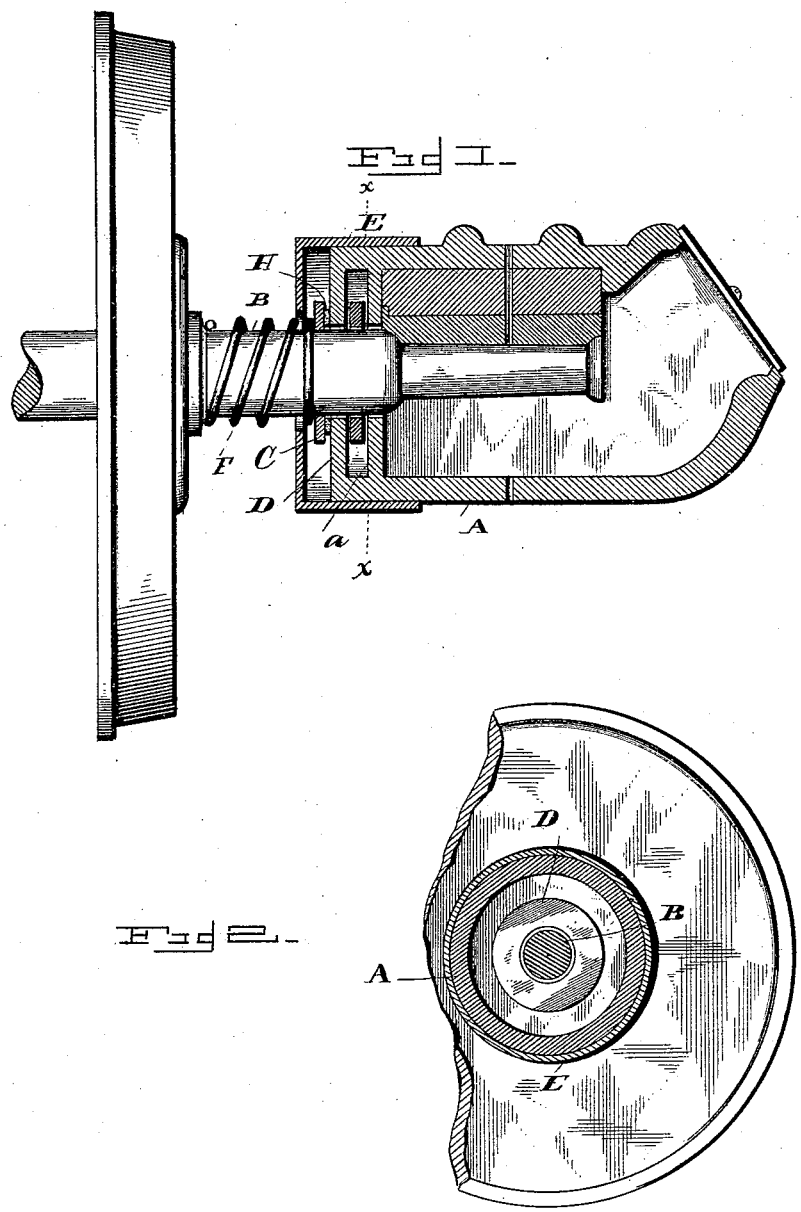

HENRY M. GOODMAN, OF LOUISVILLE, KENTUCKY.

DUST-GUARD FOR AXLE-BOXES.

SPECIFICATION forming part of Letters Patent No. 471,969, dated March 29, 1892.

Application filed November 21, 1891. Serial No. 412,609. (No model.)

*To all whom it may concern:*

Be it known that I, HENRY M. GOODMAN, a citizen of the United States, and a resident of Louisville, in the county of Jefferson and State of Kentucky, have invented certain new and useful Improvements in Dust-Guards for Axle-Boxes; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a vertical section of the invention. Fig. 2 is a cross-section of the same on the line $x$ $x$.

This invention has relation to certain new and useful improvements in dust-guards for axle-boxes; and it consists in the novel construction and combination of parts, as hereinafter specified.

In the accompanying drawings, the letter A designates an axle-box, and B the axle.

C designates an annular ring, preferably of metal, which loosely surrounds the axle at the point where it enters the box.

D is an inner ring, which is preferably of rubber or similar flexible material and loosely surrounds the axle inside the box and held in place by an interior flange $a$, formed on the wall of the box.

E is a hood or jacket, which is drawn over the rear end of the box around the axle and held in place by screws or other suitable means. This, together with the rings or washers C and D, effectually prevents the entrance of dust into the box.

To maintain the position of the guard, a spring F is coiled around the axle, bearing at one end against the wheel or the hub thereof and at the other end against the ring C. A packing-ring H may also be placed between the ring and the rear wall of the box, as shown.

Having described this invention, what I claim as new, and desire to secure by Letters Patent, is—

1. A dust-guard for axle-boxes, comprising the rings or washers loosely surrounding the axle and a hood or jacket drawn over and secured to the rear of the box, substantially as specified.

2. A dust-guard for axle-boxes, comprising the outer ring or washer loosely surrounding the axle and held to its place by a spring coiled around the axle and bearing thereagainst, a second ring or washer also loosely surrounding the axle inside of the box and held in place by an interior flange of the box, and a jacket or hood drawn over and secured to the rear portion of the box, substantially as specified.

In testimony whereof I affix my signature in presence of two witnesses.

HENRY M. GOODMAN.

Witnesses:
   E. R. PALMER,
   TOM B. MEGLEMRY.